(12) United States Patent
Marlow

(10) Patent No.: US 10,108,727 B2
(45) Date of Patent: *Oct. 23, 2018

(54) PAGE PERSONALIZATION PERFORMED BY AN EDGE SERVER

(71) Applicant: Oath Inc., New York, NY (US)

(72) Inventor: Keith Marlow, Galston (AU)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,814

(22) Filed: Feb. 12, 2018

(65) Prior Publication Data

US 2018/0165373 A1    Jun. 14, 2018

Related U.S. Application Data

(63) Continuation of application No. 13/491,517, filed on Jun. 7, 2012, now Pat. No. 9,892,198.

(51) Int. Cl.
*G06F 17/00* (2006.01)
*G06F 17/30* (2006.01)

(52) U.S. Cl.
CPC .............. *G06F 17/30867* (2013.01)

(58) Field of Classification Search
CPC ......... G06F 17/30861; G06F 17/30864; G06F 17/30867; G06F 17/30873; G06F 17/00; G06F 17/30
See application file for complete search history.

(56) References Cited

U.S. PATENT DOCUMENTS

| | | |
|---|---|---|
| 7,594,189 B1 | 9/2009 | Walker et al. |
| 8,306,975 B1 | 11/2012 | Eldering |
| 8,346,784 B1 | 1/2013 | Potekhin et al. |
| 8,504,584 B1 | 8/2013 | Baker |
| 8,538,970 B1 | 9/2013 | Tucker |
| 8,793,235 B2 | 7/2014 | Burkard et al. |
| 9,192,684 B1 | 11/2015 | Kamvar et al. |
| 2002/0010798 A1 | 1/2002 | Ben-Shaul et al. |
| 2003/0061206 A1 | 3/2003 | Qian |
| 2003/0065810 A1 | 4/2003 | Ims et al. |
| 2003/0101223 A1 | 5/2003 | Pace et al. |
| 2004/0003032 A1 | 1/2004 | Ma et al. |
| 2004/0193707 A1 | 9/2004 | Alam et al. |
| 2005/0131762 A1 | 6/2005 | Bharat et al. |
| 2005/0131887 A1 | 6/2005 | Rohrabaugh et al. |
| 2005/0216434 A1 | 9/2005 | Haveliwala et al. |

(Continued)

*Primary Examiner* — Scott T Baderman
*Assistant Examiner* — Sookil J Lee
(74) *Attorney, Agent, or Firm* — Martine Penilla Group, LLP

(57) ABSTRACT

A method is provided for performing page personalization at an edge server. In response to a page request, page mark-up is retrieved from a page server, the page mark-up including embedded edge server instructions. A plurality of content feature vectors are parsed from the embedded edge server instructions, the plurality of content feature vectors being respectively associated with a plurality of content modules. A user feature vector associated with the user is determined. The user feature vector is matched against the plurality of content feature vectors to determine a closest matching content feature vector to the user feature vector. A selected content module associated with the closest matching content feature vector is retrieved. The selected content module is combined with the page mark-up to define an edge-personalized page mark-up.

20 Claims, 5 Drawing Sheets

(56) References Cited

U.S. PATENT DOCUMENTS

| | | |
|---|---|---|
| 2006/0206475 A1 | 9/2006 | Naam et al. |
| 2007/0078828 A1 | 4/2007 | Parikh et al. |
| 2007/0100824 A1 | 5/2007 | Richardson et al. |
| 2008/0016194 A1 | 1/2008 | Chetuparambil et al. |
| 2009/0013006 A1 | 1/2009 | Friedl et al. |
| 2009/0070325 A1 | 3/2009 | Gabriel et al. |
| 2009/0119261 A1 | 5/2009 | Ismalon |
| 2009/0119293 A1 | 5/2009 | Li et al. |
| 2009/0132459 A1 | 5/2009 | Hicks |
| 2009/0150518 A1 | 6/2009 | Lewin et al. |
| 2010/0030773 A1 | 2/2010 | Patterson |
| 2010/0166339 A1 | 7/2010 | Gokturk et al. |
| 2010/0274819 A1 | 10/2010 | Lewin et al. |
| 2011/0022549 A1 | 1/2011 | Zhuang et al. |
| 2011/0184930 A1 | 7/2011 | Pfleger et al. |
| 2011/0197126 A1 | 8/2011 | Arastafar |
| 2011/0320429 A1 | 12/2011 | Doig et al. |
| 2012/0054216 A1 | 3/2012 | Haahr et al. |
| 2012/0203873 A1 | 8/2012 | Lewin et al. |
| 2012/0215779 A1 | 8/2012 | Lipstone |
| 2013/0080626 A1 | 3/2013 | Thibeault |
| 2013/0103704 A1 | 4/2013 | Potekhin et al. |
| 2013/0275419 A1 | 10/2013 | Li et al. |
| 2014/0006484 A1 | 1/2014 | Devanneaux et al. |

PAGE PERSONALIZATION PERFORMED BY AN EDGE SERVER

BACKGROUND

1. Field of the Invention

The present invention relates to methods and systems for performing page personalization at an edge server.

2. Description of the Related Art

In various regions of the world, there are a variety of point-to-point networking conditions. Some markets may have excellent bandwidth and general networking availability while others have low bandwidth and low quality of service (QoS). One strategy for improving the end-user experience is to employ edge computing which generally situates services and content at the "edge" of the network, closer to the end users. By doing so, the volume of data which must be moved over the network is reduced, thereby reducing network resource consumption and latency, improving the end user's QoS. Edge computing systems and servers often rely upon cached resources and data to facilitate faster delivery of content to the user.

Edge Side Includes (ESI) is a markup language for dynamic assembly of content at the edge of the network. Broadly speaking, ESI is an XML language designed to be inserted into markup, and targeted for processing after the markup has left the origin server, but before it is paginated by the end user's client.

However, personalization typically relies upon centralized decision making and greatly reduces the amount of content in a page that can be cached. The result is that even when conventional edge computing methods are employed, personalized services are still delivered with a poor level of performance. Furthermore, there may be a prohibitive level of cost required to raise the QoS to one which is acceptable.

It is in this context that embodiments of the invention arise.

SUMMARY

Broadly speaking, embodiments of the present invention provide methods and systems for performing page personalization at the edge side of a network. Several inventive embodiments of the present invention are described below.

The methods and systems described herein reduce the critical dependency on a central service to provide personalization and maintain the benefits of using ESI. A feature vector, U, is defined for the user. For each module of content for consideration a feature vector, C, is defined. These are applied to a fit function to obtain a value measuring how closely the two features 'fit' each other. In one embodiment, the ESI command set is extended to include a switch statement containing a set of feature vectors, one vector per module to be included. Each vector C is compared in turn against the user's U vector and the associated module with the closest fit is included at that point in time. Broadly speaking, the disclosed methods and systems enable a 'culling' of modules of content for consideration which are not in scope due to an unsuitable personalization fit to the specific user. In some embodiments, the user's feature vector U can be derived from cookies or from a user record lookup.

In various embodiments, several extensions are contemplated. For example, default/fallback actions in the event of a particular module not being available or down can be provided as a refinement to the module selection. Furthermore, attributes that already have been heavily matched in the page so far may be down-weighted, so as to provide content keyed against a user's primary and secondary interests, rather than content focused in one direction of interest.

Several advantages are provided by the embodiments of the invention. For example, the callback dependency to the center for the decision as to what modules of content to include is removed. Personalization can still occur within each module as served, but the critical time dependency to the center for the basic page framework is removed. This improves perceived performance to the user, while also improving reliability. Moreover, it is possible to cache at the edge the general page structure containing the ESI commands and the switch statements. Given the increasing availability of processing power at the edge, general utilization of edge services is improved. Furthermore, if nested ESI is enabled (e.g. ESI commands within content returned from an ESI include), it is possible for the modules themselves to make use of ESI switch statements, thereby further increasing the usage of edge cache services, and so improving performance further and reducing the critical dependency on back-end services in a live page serve.

In one embodiment, a method is provided for performing page personalization at an edge server. The method initiates with receiving a page request from a user's browser. In response to receiving the page request, a page mark-up is retrieved from a page server, the page mark-up including embedded edge server instructions. An edge server matching object is parsed from the embedded edge server instructions, the edge server matching object defining a plurality of content feature vectors which are respectively associated with a plurality of content modules. A user feature vector associated with the user is determined. The user feature vector is matched against the plurality of content feature vectors to determine a closest matching content feature vector to the user feature vector. A selected content module associated with the closest matching content feature vector is retrieved. The selected content module is combined with the page mark-up to define an edge-personalized page mark-up. The edge-personalized page mark-up is sent to the user's browser.

In one embodiment, the edge server instructions include Edge Side Includes (ESI) instructions, and the edge server matching object is an ESI matching object, the ESI matching object defining a plurality of ESI include instructions corresponding respectively to the plurality of content modules.

In one embodiment, determining the user feature vector includes analyzing a cookie associated with the user's browser or performing a lookup in a user database.

In one embodiment, each of the user feature vector and the plurality of content feature vectors is defined by a plurality of key value pairs. In one embodiment, matching the user feature vector against the plurality of content feature vectors includes applying a weighted function to the key value pairs defined by the user feature vector and the plurality of content feature vectors.

In one embodiment, retrieving the selected content module includes determining if the selected content module is available from a cache, and if so, then retrieving the selected content module from the cache.

In another embodiment, a non-transitory computer-readable medium having program instructions embodied thereon for performing page personalization at an edge server is provided. The program instructions include: program instructions for receiving a page request from a user's browser; program instructions for, in response to receiving the page request, retrieving a page mark-up from a page server, the page mark-up including embedded edge server instructions; program instructions for parsing an edge server matching object from the embedded edge server instructions, the edge server matching object defining a plurality of content feature vectors which are respectively associated with a plurality of content modules; program instructions for determining a user feature vector associated with the user; program instructions for matching the user feature vector against the plurality of content feature vectors to determine a closest matching content feature vector to the user feature vector; program instructions for retrieving a selected content module associated with the closest matching content feature vector; program instructions for combining the selected content module with the page mark-up to define an edge-personalized page mark-up; and program instructions for sending the edge-personalized page mark-up to the user's browser.

In another embodiment, an edge server for performing page personalization is provided. The edge server includes: a request handler for receiving a page request from a user's browser, and in response to receiving the page request, retrieving a page mark-up from a page server, the page mark-up including embedded edge server instructions; a page mark-up parser for parsing an edge server matching object from the embedded edge server instructions, the edge server matching object defining a plurality of content feature vectors which are respectively associated with a plurality of content modules; an edge server instruction processor for determining a user feature vector associated with the user, matching the user feature vector against the plurality of content feature vectors to determine a closest matching content feature vector to the user feature vector, and retrieving a selected content module associated with the closest matching content feature vector, and combining the selected content module with the page mark-up to define an edge-personalized page mark-up; and the request handler sends the edge-personalized page mark-up to the user's browser.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for performing page personalization at an edge server.

Broadly speaking, in response to a request for a particular page, page markup is retrieved containing embedded edge server instructions which define feature vectors for a plurality of content modules under consideration for inclusion in the content page. The edge server performs a vector matching analysis of the feature vectors of the content modules against a user feature vector defined for the user. Based on this analysis, a best matching vector for the user is determined, and the corresponding content module is included in the page markup.

It will be obvious, however, to one skilled in the art, that the present invention may be practiced without some or all of the specific details disclosed herein. In other instances, well known process operations have not been described in detail in order not to unnecessarily obscure the present invention.

Figure 1:
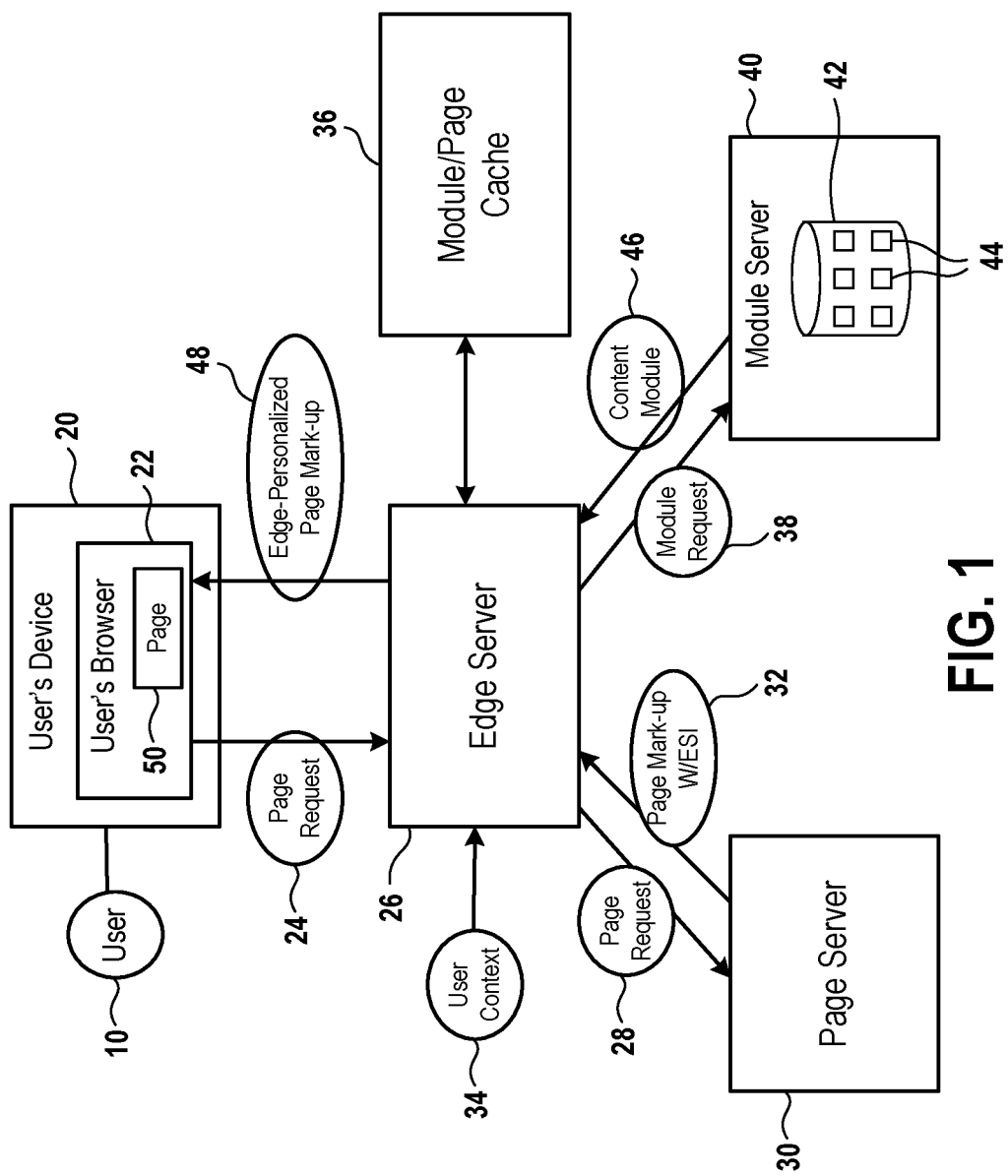
FIG. 1 illustrates a system for performing edge personalization of a content page, in accordance with embodiments of the invention.

FIG. 1 illustrates a system for performing edge personalization of a content page, in accordance with embodiments of the invention. For purposes of ease of disclosure, a content page shall generally be referenced and described in terms of an internet web page displayed in a browser application. However, it will be appreciated by those skilled in the art that a content page can include any other type of page that may be displayed on a device, and which presents content from modules selected in accordance with the methods and systems described herein. Merely by way of example, a content page may also be construed as a viewing page in an application (e.g. mobile app, desktop application), a page in an electronic publication (e.g. an electronic magazine), or any other type of page which presents content and which can be personalized at the edge in accordance with embodiments described herein.

As shown, a user 10 operates a browser application 22 on a device 20. The device 20 can be any kind of networked device useful for accessing content pages, such as a desktop computer, laptop computer, tablet computer, smart phone, etc. In response to the user's input, the browser 22 generates a page request 24 that is sent to an edge server 26. In one embodiment, the edge server 26 determines whether the content page requested by the user's browser 22 is available from a cache 36, and if so, then retrieves the content page data from the cache 36 and serves it to the user's browser 22. However, if the requested content page is not available from the cache, then the edge server 26 passes the request as page request 28 to a page server 30. The page server 30 returns page mark-up 32, which includes embedded edge server instructions for execution by the edge server 26. In one embodiment, the edge server instructions are ESI instructions.

The edge server instructions are parsed from the page mark-up 32 by the edge server 26, and in particular, an edge server matching object is parsed from the edge server instructions. The edge server matching object defines a selection of content modules from which a single content module is selected for presentation on the content page. Each content module has an associated feature vector. The edge server 26 determines the user's context 34 to define a feature vector associated with the user. The user's feature vector is compared against the feature vectors of the content modules referenced by the matching object to determine which content module provides the closest fit for the user. The selected content module is then retrieved from a cache 36 if possible.

If the selected content module is not available from the cache 36, then a module request 38 is sent to a module server 40 for the selected content module. The module server 40 includes content module storage 42 having various content modules 44. The selected content module 46 is returned to the edge server 26 in response to the request 38. The selected content module is then incorporated into the page mark-up to define edge-personalized page mark-up 48 that is served to the user's browser 22. The browser 22 then renders the edge-personalized page mark-up as content page 50.

Figure 2:
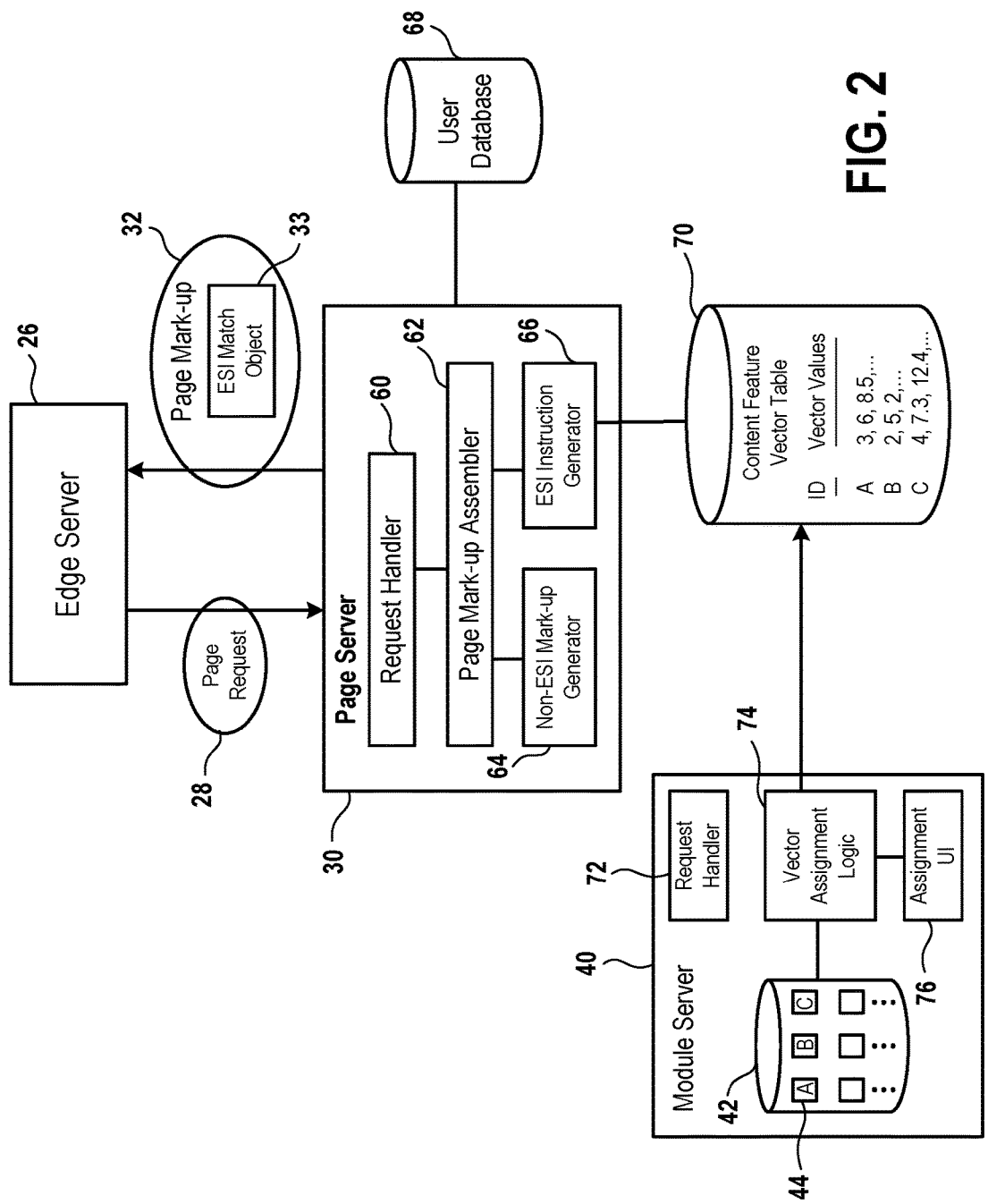
FIG. 2 illustrates a detailed view of systems and activity relating to the page server 30, in accordance with embodiments of the invention.

FIG. 2 illustrates a detailed view of systems and activity relating to the page server 30, in accordance with embodiments of the invention. The page server 30 includes a request handler 60 for receiving the page request 28 and responding to it. In response to receiving the page request 28, a page markup assembler 62 is activated to generate the page markup 32 that will be returned to the edge server 26. A non-ESI markup generator 64 is provided for generating markup that is not intended to be executed by the edge server 26. An ESI instruction generator 66 is likewise provided for generating edge server instructions that will be embedded in the page markup by the page markup assembler 62. In some embodiments, the page server 30 may access a user database 68 which contains data relating to the user (e.g. demographic or personal information such as age, gender, location, preferences, browsing history, etc.). Such data may be utilized by the page markup assembler 62, the non-ESI markup generator 64, or the ESI instruction generator 66 for purposes of personalizing the page markup.

As noted, the ESI instruction generator 66 generates edge server instructions that define an ESI matching object 33. The ESI matching object 33 defines a selection of content modules from which a selected content module will be identified for presentation to the user as part of the content page. In one embodiment, the ESI matching object 33 includes content module identifiers as well as corresponding feature vectors for the selection of content modules. The ESI instruction generator 66 retrieves this information from the content feature vector table 70, which contains content module identifiers as well as values which define the feature vectors corresponding to the content modules.

For each content module 44 in the content module storage 42, a feature vector is preassigned. In one embodiment, vector assignment logic 74 is provided for determining a feature vector for a given content module. In some embodiments, the feature vector for a given content module can be assigned based on predefined analysis methods and calculations, taking into consideration various factors such as keywords, multimedia content, metadata contents, and any other types of data relating to a particular content module that may be relevant for purposes of personalization of a content page in which the content module may be included. In one embodiment, an assignment user interface 76 is provided for enabling an editor to manually determine the feature vector associated with a given content module.

It will be appreciated that in some embodiments, the determination of a feature vector for a given content module can be periodically determined, so that the feature vector and its constituent values may evolve over time. For example, the content module feature vector may be in part determined based on historical data relating to user interactions with the content module, such as the characteristics of users who have selected the content module for viewing, the performance of advertising associated with the content module, and other kinds of data indicative of the prior performance of the content module when included in a content page. Thus, the vector assignment logic 74 is utilized to populate the content feature vector table 70 with corresponding vector values which define a content module feature vector for each content module. The ESI instruction generator 66 determines the selection of content modules to be included for consideration in the ESI matching object 33, and retrieves the associated content module feature vectors from the content module feature vector table 70. The particular selection of content modules included for consideration may be based on known user data, such as the user's location, age, gender, browsing history, etc.

As noted above, the content module identifiers and corresponding content module feature vectors are incorporated into an ESI matching object. The ESI matching object is embedded into the page markup 32 that is returned to the edge server 26 in response to the page request 28.

Figure 3:
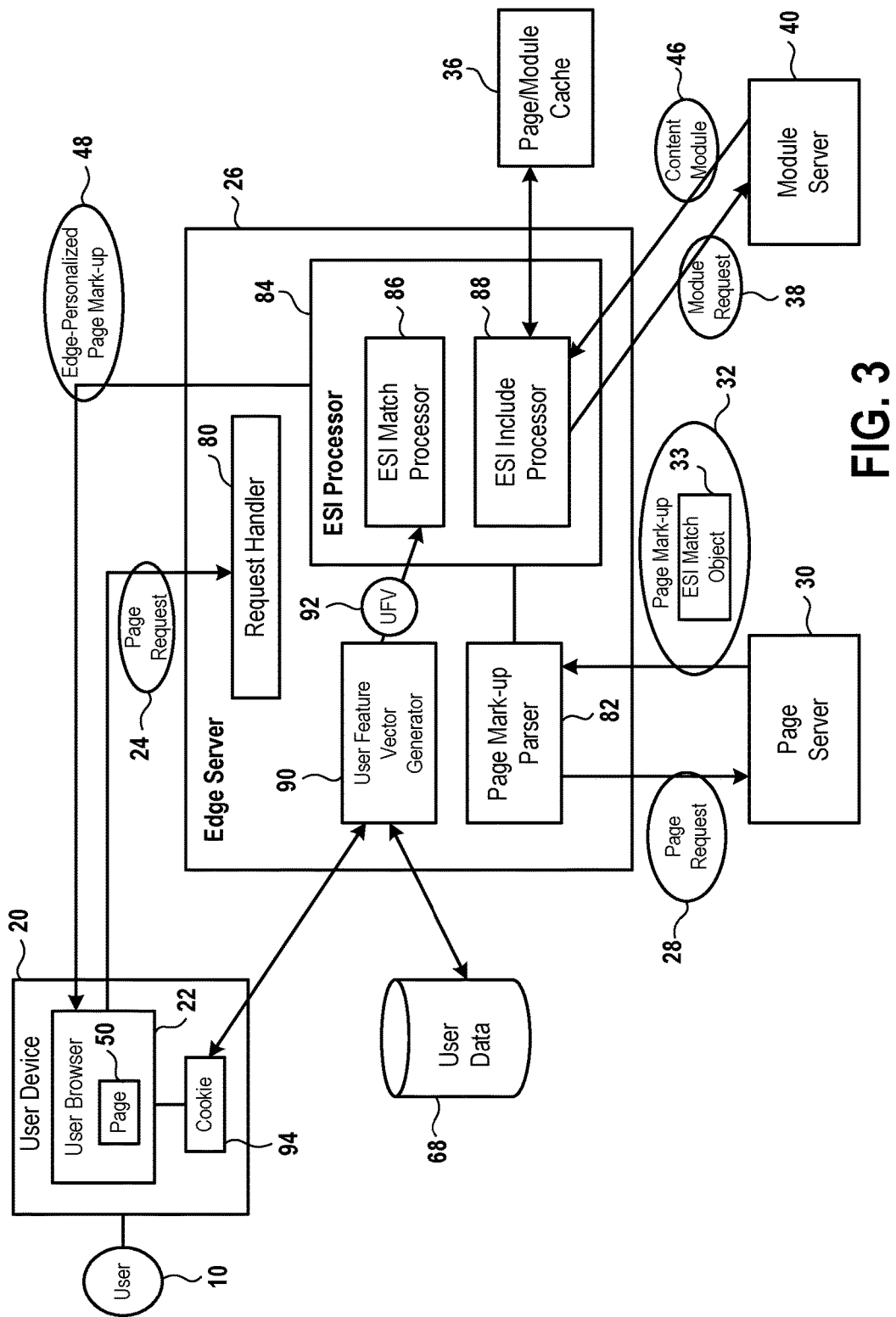
FIG. 3 illustrates a detailed view of systems and activity relating to the edge server 26, in accordance with embodiments of the invention.

FIG. 3 illustrates a detailed view of systems and activity relating to the edge server 26, in accordance with embodiments of the invention. The edge server 26 includes a request handler 80 that receives the page request 24 and responds to it. As has been noted, if the requested page is not already available from the cache 36, then edge server 26 passes the request to the page server 30, which assembles and returns page markup 32 to the edge server 26. The edge server 26 includes a page markup parser 82 for parsing the page markup 32 to identify embedded edge server instructions. In one embodiment, the edge server instructions are ESI instructions, for which an ESI processor 84 is provided for processing the ESI instructions. In the illustrated embodiment, the ESI matching object is identified and processed by an ESI match processor 86. Processing of the ESI matching object includes activation of a user feature vector generator 90 to generate a user feature vector 92 for the user 10. In one embodiment, the user feature vector is generated based on examination of a cookie 94 associated with the user's browser 22. It will be appreciated that the cookie 94 may contain various kinds of information relating to the user's internet activity, such as their browsing history, preferences, etc. In another embodiment, the user feature vector is generated based on user data stored in a user database 68, e.g. location, age, gender, preferences, history, etc.

The ESI match processor 86 compares the user feature vector 92 to the feature vectors of the selection of content modules identified by the ESI match object 33, to determine a closest matching content module feature vector to the user feature vector 92 (possibly subject to constraints, as described below). In one embodiment, the comparison analysis may entail a least squares analysis of the feature vectors. In another embodiment, the analysis may include analysis based on a weighted function assigning various weights to the specific vector values.

When the selected content module is determined, an ESI include processor 88 retrieves the selected content module 46 either from cache 36 or from the module server 40. The content module 46 is then incorporated by the ESI processor into the page markup to define the edge-personalized page markup 48. The edge-personalized page markup 48 is sent to the user device 20 and rendered by the browser 22.

As has been noted, the ESI protocol can be extended to define feature vectors. One example is to define an ESI vector field as a set of key value pairs, with the key being a feature ID, and the value being a decimal value or other value type. Such a vector field could have a form such as the following: vector="a=1.2;b=-0.4;e=3". Another possibility would be to include multi-dimensional values, such that a value in itself would be a vector, such as the following: vector="a=[11,-0.4];c=-1.2;d=5.5". In another embodiment, a vector may be fully enumerated wherein the position of the value functions as its key, such as the following: vector="1.1,2.1,-3.0,3.5". It will be appreciated that as the vector is fully enumerated, even non-relevant or zero values will still need to be present because of the positional dependence across vectors. In another example, the vector could include multi-dimensional values, and be fully enumerated, such as the following: vector="[1.1,−0.4],2.1,−3.0, 3.5". It will be appreciated that vectors may have many different forms, and may vary in terms of the features included, the applicable value types, and value ranges.

In various embodiments, the specific matching process employed to match the user feature vector to one of the selection of content feature vectors can vary depending upon the priorities of the user and the content host. The matching process can be as simple or complex as required, provided that it executes on the edge server and is completed in a time suitable for providing the desired level of responsiveness for the end user. As has been noted, the matching process may employ a mathematical closest match analysis, such as a least squares analysis or other type of weighted function. The matching process may further incorporate business logic (e.g. both the user vector and the content feature vector must have the 'a' key defined and have a value greater than 2.0). In one embodiment, the matching process performs a multi-pass procedure, including a business logic pass which eliminates certain content module candidates from consideration (based on their content feature vectors), followed by a mathematical closest match analysis.

Additionally, in some scenarios, it may be the case that the content module having the closest matching content feature vector is not available for fulfillment (e.g. the remote server containing the content module is not available). In such a situation, the matching process could be configured to apply the second closest match. It will be appreciated that the determination of availability could be determined through actual request of the content module, or with reference to knowledge acquired from a previous attempt to obtain the same content module.

In one embodiment, the ESI matching object may be defined by ESI markup instructions such as the following:

```
<esi:match>
  <esi:include vector="a=2.2;c=−1.2;d=5.5" src= "http:awebsite.com/sports.html"/>
  <esi:include vector="a=0.1;c=1.5;d=2.0" src= "http:awebsite.com/fashion.html"/>
<esi:match>
```

As shown in the above, the ESI matching object includes several ESI include instructions, each of which corresponds to a content module. Each ESI include instruction defines a content feature vector for the content modules, and a resource location where the content module can be obtained. The matching process determines, based on matching the content feature vectors to the user vector to find the best match, which ESI include instruction to apply and consequently which content module to include in the content page.

To improve the user experience, the matching procedure could include heuristics to avoid over-focusing on a particular subject area or type of content. For example, following matching of a specific content feature vector to the user feature vector, the matching process may down-weight the terms that matched in the user feature vector for future matching operations. The degree of the down-weighting will determine how much the subject will influence further vector matches for content modules on the same page. Without such an adjustment, it may be the case that a user will receive content modules of only a certain type (e.g. despite a user having a known interest in the subject areas of sports and computers, the user may receive only sports modules). However, with such an adjustment, then the user will be more likely to receive a greater variety of the types of content modules (e.g. the user will receive sports modules and some computer modules if available). In one embodiment, an adjustment vector is defined within the ESI include statement to perform a more precise adjustment of the weights as required. In one embodiment, an adjusted user vector is passed to the module server as part of the request to enable the module server to personalize its content more with some awareness of the context of inclusion.

Figure 4:
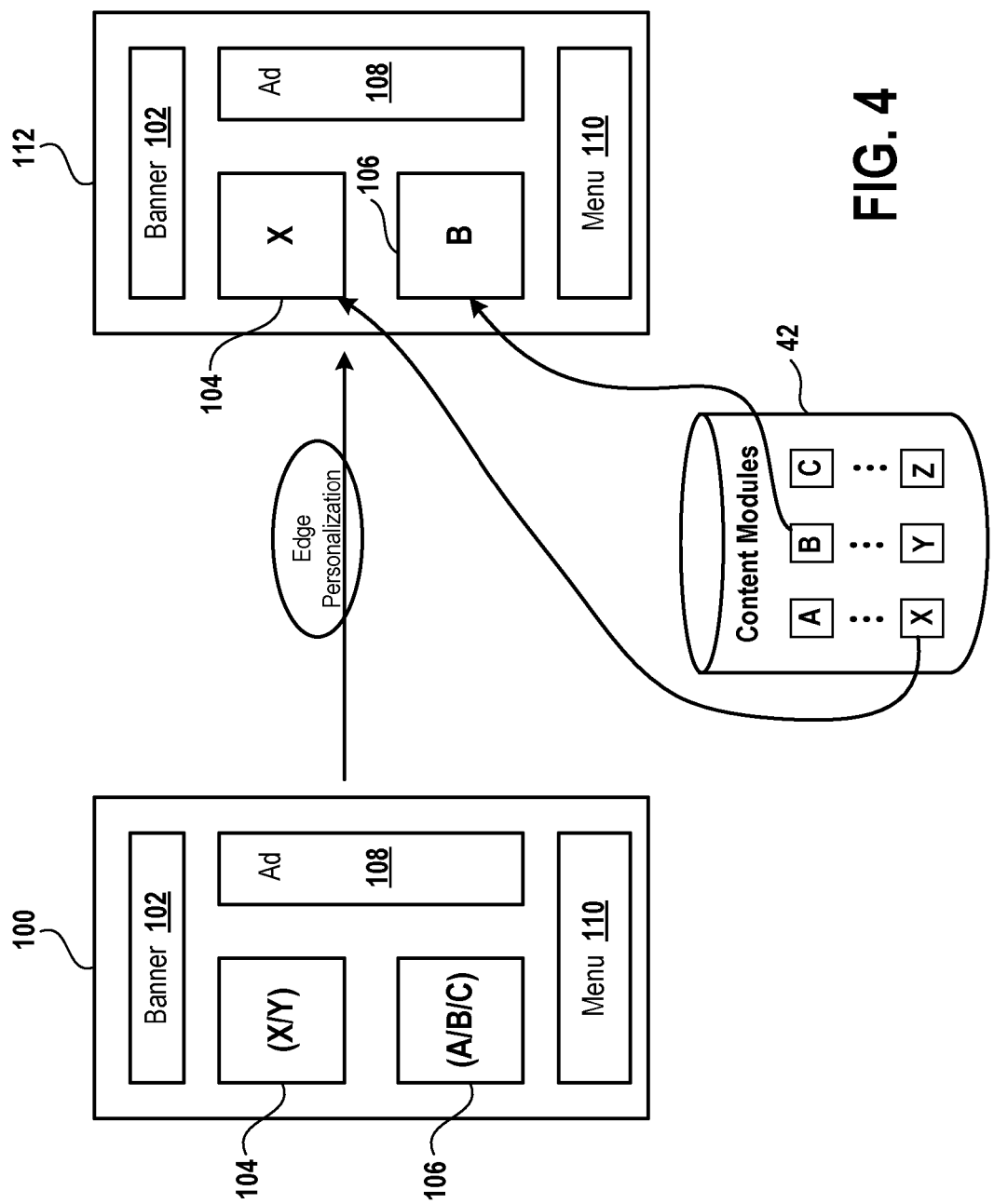
FIG. 4 conceptually illustrates edge personalization of a content page, in accordance with embodiments of the invention.

FIG. 4 conceptually illustrates edge personalization of a content page, in accordance with embodiments of the invention. A non-personalized page 100 is defined by page markup as received from a page server prior to edge personalization. The page 100 includes various predefined content locations, which may or may not be configured for edge personalization by an edge server. In the illustrated embodiment, the page 100 includes a banner location 102 for placement of a static banner, and advertisement location 108 for placement of an advertisement, and a menu location 110 for placement of a menu. In one embodiment, there are also defined content locations 104 and 106, each of which is configured to undergo an edge personalization process to determine which one of a selection of content modules will be placed at the content location. In the illustrated embodiment, for content location 104, the selection of content modules includes content modules X and Y, one of which will be selected for inclusion based on the edge personalization process. For content location 106, the selection of content modules includes content modules A, B, and C, one of which will be selected for inclusion based on the edge personalization process.

The edge personalization process selects which of the selection of content modules will be included at the content locations 104 and 106. In the illustrated embodiment, after edge personalization has been performed, the content module X has been selected for the location 104 and the content module B has been selected for the location 106. The content modules B and X are retrieved by the edge server to populate the locations 104 and 106, respectively, of the content page 112.

The feature vector matching process performed at the edge server as described herein is utilized to select a specific content module for inclusion in a content page from a plurality of content modules. It will be appreciated that the plurality of content modules may include or define any of various content types, categories, features, or any other content characteristic for which edge personalization may be performed. By way of example, a web portal page may be defined to present different categories of content, such as sports, finance, news, entertainment, travel, weather, local, etc. For a given location on the web portal page, the edge personalization process can be utilized to determine which category of content will populate the location. This is achieved through selection of content modules as has been described, wherein each of the possible content modules under consideration defines content of a particular category. It will be appreciated that a content module can be defined for a category of content as in the instant example, with the specific content data, such as specific text or image data, being defined dynamically by the module server from which the content module is retrieved for inclusion in the page. In other words, a reference locator for a content module may retrieve data that is dynamically determined, and may change over time. Thus, selection of the same content module in accordance with edge personalization may yield different specific content data when the same content module is retrieved at different times.

Another example of a content selection scenario could entail selection amongst different types of media, such whether to include text, an image, a video, an audio recording, etc. The foregoing are merely examples of scenarios in which edge personalization may be utilized to tailor the content presented on a content page to a given user. In other embodiments, the particular selection of content modules which are considered for inclusion, as defined in an ESI matching object, can include any of various types and kinds of content modules, provided they are suitable for edge personalization via a feature vector matching process, as defined herein.

Figure 5:
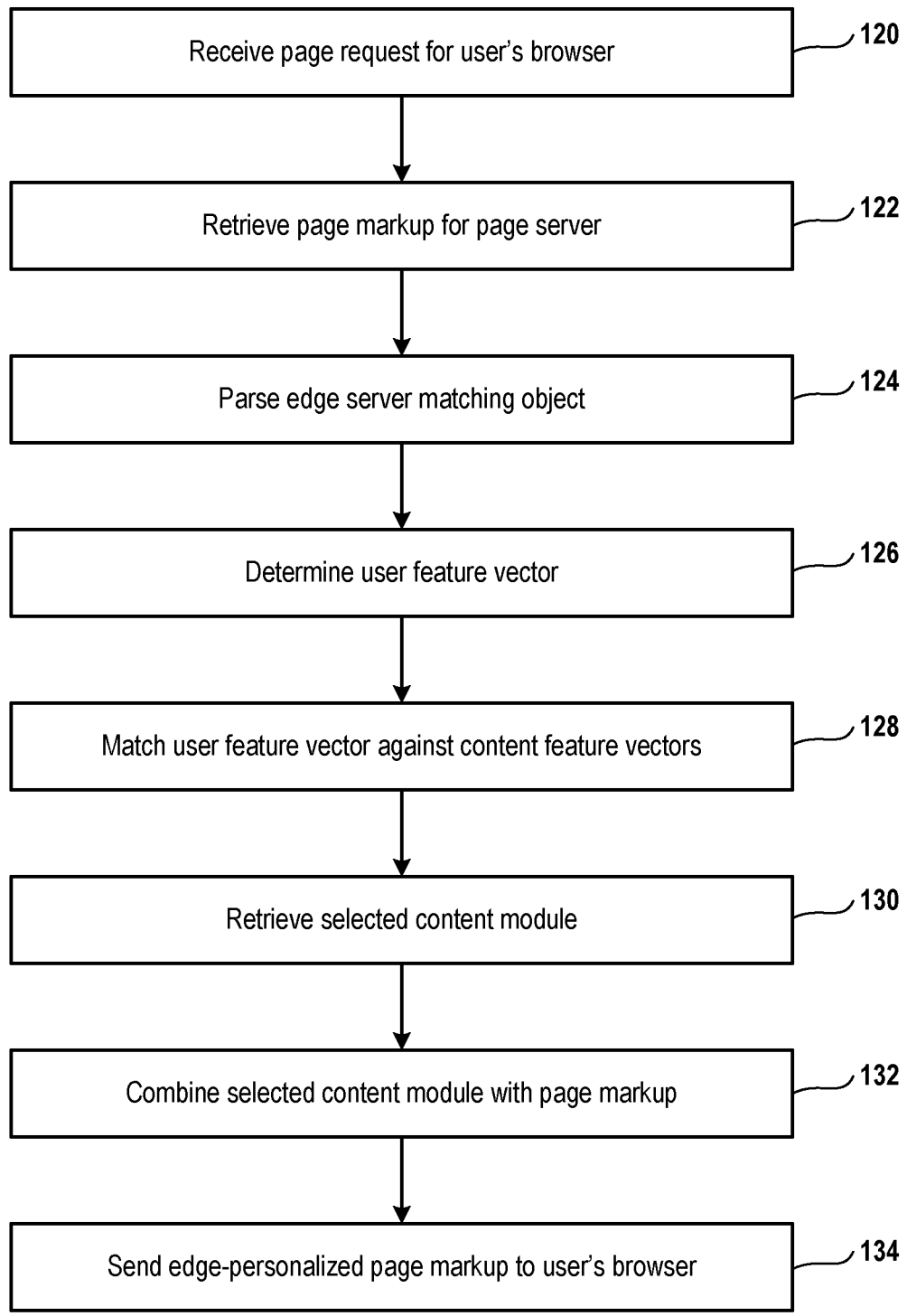
FIG. 5 illustrates a method for performing page personalization at an edge server, in accordance with an embodiment of the invention.

FIG. 5 illustrates a method for performing page personalization at an edge server, in accordance with an embodiment of the invention. At method operation 120, the method initiates with receiving a page request from a user's browser. At method operation 122, in response to receiving the page request, a page mark-up is retrieved from a page server, the page mark-up including embedded edge server instructions. At method operation 124, an edge server matching object is parsed from the embedded edge server instructions, the edge server matching object defining a plurality of content feature vectors which are respectively associated with a plurality of content modules. At method operation 126, a user feature vector associated with the user is determined. At method operation 128, the user feature vector is matched against the plurality of content feature vectors to determine a closest matching content feature vector to the user feature vector. At method operation 130, a selected content module associated with the closest matching content feature vector is retrieved. At method operation 132, the selected content module is combined with the page mark-up to define an edge-personalized page mark-up. At method operation 134, the edge-personalized page mark-up is sent to the user's browser.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing page personalization at an edge server, comprising:
   receiving, over a network at the edge server, a page request from a client device, the client device being associated with user activity data;
   in response to receiving the page request, retrieving, over the network by the edge server, a page mark-up from a page server, the page mark-up including embedded edge server instructions;

parsing, by the edge server from the embedded edge server instructions, a plurality of content feature vectors which are respectively associated with a plurality of content modules, each of the plurality of content modules respectively defined to present different content data;

generating, by the edge server, a user feature vector that is defined for the user, the user feature vector being generated based on the user activity data;

matching, by the edge server, the user feature vector against the plurality of content feature vectors to determine a closest matching content feature vector to the user feature vector, wherein the determination of the closest matching content feature vector determines which of the plurality of content modules will be included in the page mark-up;

retrieving, over the network by the edge server, a selected content module associated with the closest matching content feature vector;

combining, by the edge server, the selected content module with the page mark-up to define an edge-personalized page mark-up;

sending, over the network by the edge server, the edge-personalized page mark-up to the client device; and, further in response to receiving the page request and after the matching by the edge server, down-weighting, by the edge server, one or more of a plurality of attributes, based on the matching of the user feature vector against the plurality of content feature vectors, the attributes that are down-weighted being attributes of the closest matching content feature vector that matched closest against the user feature vector.

2. The method of claim 1,
wherein the edge server instructions include Edge Side Includes (ESI) instructions; and
wherein the edge server instructions include an ESI matching object, the ESI matching object defining a plurality of ESI include instructions corresponding respectively to the plurality of content modules.

3. The method of claim 1, wherein determining the user feature vector includes at least one of analyzing a cookie associated with a browser of the client device or performing a lookup in a user database.

4. The method of claim 1, wherein retrieving the selected content module includes determining if the selected content module is available from a cache, and if so, then retrieving the selected content module from the cache.

5. The method of claim 1, wherein the edge server is defined at a first location on the network that is closer to the client device than a second location on the network at which the page server is defined.

6. The method of claim 1,
wherein the user activity data includes browsing history data associated with the client device; and
wherein the user feature vector is generated based on the browsing history data.

7. The method of claim 1, wherein the down-weighting is configured to reduce a likelihood that a subsequent page request by the user will result in retrieval of a same content module as the selected content module.

8. The method of claim 1,
wherein each of the user feature vector and the plurality of content feature vectors is defined by a plurality of key values;
wherein matching the user feature vector against the plurality of content feature vectors includes, for each one of the plurality of content feature vectors, applying a weighted function to the key values defined by the user feature vector and the one of the plurality of content feature vectors, to identify which one of the plurality of content feature vectors is the closest matching content feature vector to the user feature vector.

9. A non-transitory computer-readable medium having program instructions embodied thereon for performing page personalization at an edge server, the program instructions including:
program instructions for receiving, over a network at the edge server, a page request from a client device, the client device being associated with user activity data;
program instructions for, in response to receiving the page request, retrieving, over the network by the edge server, a page mark-up from a page server, the page mark-up including embedded edge server instructions;
program instructions for parsing, by the edge server from the embedded edge server instructions, a plurality of content feature vectors which are respectively associated with a plurality of content modules, each of the plurality of content modules respectively defined to present different content data;
program instructions for generating, by the edge server, a user feature vector that is defined for the user, the user feature vector being generated based on the user activity data;
program instructions for matching, by the edge server, the user feature vector against the plurality of content feature vectors to determine a closest matching content feature vector to the user feature vector, wherein the determination of the closest matching content feature vector determines which of the plurality of content modules will be included in the page mark-up;
program instructions for retrieving, over the network by the edge server, a selected content module associated with the closest matching content feature vector;
program instructions for combining, by the edge server, the selected content module with the page mark-up to define an edge-personalized page mark-up;
program instructions for sending, over the network by the edge server, the edge-personalized page mark-up to the client device; and,
program instructions for, further in response to receiving the page request and after the matching by the edge server, down-weighting, by the edge server, one or more of a plurality of attributes, based on the matching of the user feature vector against the plurality of content feature vectors, the attributes that are down-weighted being attributes of the closest matching content feature vector that matched closest against the user feature vector.

10. The non-transitory computer-readable medium of claim 9,
wherein the edge server instructions include Edge Side Includes (ESI) instructions; and
wherein the edge server instructions include an ESI matching object, the ESI matching object defining a plurality of ESI include instructions corresponding respectively to the plurality of content modules.

11. The non-transitory computer-readable medium of claim 9, wherein determining the user feature vector includes at least one of analyzing a cookie associated with a browser of the client device or performing a lookup in a user database.

12. The non-transitory computer-readable medium of claim 9, wherein retrieving the selected content module includes determining if the selected content module is available from a cache, and if so, then retrieving the selected content module from the cache.

13. The non-transitory computer-readable medium of claim 9, wherein the edge server is defined at a first location on the network that is closer to the client device than a second location on the network at which the page server is defined.

14. The non-transitory computer-readable medium of claim 9,
wherein the user activity data includes browsing history data associated with the client device; and
wherein the user feature vector is generated based on the browsing history data.

15. The non-transitory computer-readable medium of claim 9, wherein the down-weighting is configured to reduce a likelihood that a subsequent page request by the user will result in retrieval of a same content module as the selected content module.

16. The non-transitory computer-readable medium of claim 9,
wherein each of the user feature vector and the plurality of content feature vectors is defined by a plurality of key values;
wherein matching the user feature vector against the plurality of content feature vectors includes, for each one of the plurality of content feature vectors, applying a weighted function to the key values defined by the user feature vector and the one of the plurality of content feature vectors, to identify which one of the plurality of content feature vectors is the closest matching content feature vector to the user feature vector.

17. An edge server for performing page personalization, comprising:
a request handler for receiving, over a network, a page request from a client device, the client device being associated with user activity data, and in response to receiving the page request, retrieving, over the network, a page mark-up from a page server, the page mark-up including embedded edge server instructions;
a page mark-up parser for parsing from the embedded edge server instructions a plurality of content feature vectors which are respectively associated with a plurality of content modules, each of the plurality of content modules respectively defined to present different content data;
an edge server instruction processor for generating a user feature vector that is defined for the user, the user feature vector being generated based on the user activity data, matching the user feature vector against the plurality of content feature vectors to determine a closest matching content feature vector to the user feature vector, wherein the determination of the closest matching content feature vector determines which of the plurality of content modules will be included in the page mark-up, and retrieving, over the network, a selected content module associated with the closest matching content feature vector, and combining the selected content module with the page mark-up to define an edge-personalized page mark-up; and
wherein the request handler sends the edge-personalized page mark-up to the client device;
wherein the edge server instruction processor is configured to, further in response to receiving the page request and after the matching, down-weight one or more of a plurality of attributes, to which the key values correspond, based on the matching of the user feature vector against the plurality of content feature vectors, the attributes that are down-weighted being attributes of the closest matching content feature vector that matched closest against the user feature vector.

18. The edge server of claim 17,
wherein the edge server instructions include Edge Side Includes (ESI) instructions; and
wherein the edge server instructions include an ESI matching object, the ESI matching object defining a plurality of ESI include instructions corresponding respectively to the plurality of content modules.

19. The edge server of claim 17, wherein determining the user feature vector includes at least one of analyzing a cookie associated with a browser of the client device or performing a lookup in a user database.

20. The edge server of claim 17, wherein retrieving the selected content module includes determining if the selected content module is available from a cache, and if so, then retrieving the selected content module from the cache.

* * * * *